(12) United States Patent
Nojaba et al.

(10) Patent No.: US 8,004,782 B1
(45) Date of Patent: Aug. 23, 2011

(54) TESTER WITH VIRTUAL GROUND

(75) Inventors: Michael Nojaba, Gustine, CA (US); Pradeep K. Thayamballi, Fremont, CA (US); James Tze-Hwa Tung, Atherton, CA (US); Julius A. Turangan, Livermore, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 218 days.

(21) Appl. No.: 12/407,619

(22) Filed: Mar. 19, 2009

(51) Int. Cl.
*G11B 27/36* (2006.01)
*G11B 33/14* (2006.01)
*G11B 5/33* (2006.01)
*G01R 33/00* (2006.01)

(52) U.S. Cl. .................. 360/31; 360/97.02; 360/323
(58) Field of Classification Search .................. None
See application file for complete search history.

(56) References Cited

U.S. PATENT DOCUMENTS

| | | |
|---|---|---|
| 3,818,545 A | 6/1974 | Olson et al. |
| 4,194,191 A | 3/1980 | Salem |
| 4,361,763 A | 11/1982 | Bryant et al. |
| 5,053,754 A | 10/1991 | Wong |
| 5,696,585 A | 12/1997 | Wahl et al. |
| 5,729,404 A | 3/1998 | Dunfield et al. |
| 5,760,509 A | 6/1998 | Chung |
| 5,783,882 A | 7/1998 | Brezoczky et al. |
| 5,801,464 A | 9/1998 | Brezoczky |
| 5,844,748 A | 12/1998 | Dunfield et al. |
| 6,151,189 A | 11/2000 | Brooks |
| 6,396,179 B2 | 5/2002 | Sorenson et al. |
| 7,363,638 B2 | 4/2008 | Peng |
| 2001/0048255 A1 | 12/2001 | Sorenson et al. |
| 2007/0094677 A1 | 4/2007 | Peng |
| 2007/0183089 A1 | 8/2007 | Khan et al. |
| 2008/0299878 A1 * | 12/2008 | Ward et al. .............. 451/288 |

* cited by examiner

*Primary Examiner* — Daniell L Negrón
*Assistant Examiner* — Regina N Holder (57) ABSTRACT

A tester system includes a tester and a radioactive isotope source. The tester includes a spindle assembly, a disk mounted to the spindle assembly, and a head actuatable over the disk. The radioactive isotope source is positioned in an ionizing location proximate the tester, such that a minimum distance between the radioactive isotope source and an axis of rotation of the disk is less than a radius of the disk.

25 Claims, 10 Drawing Sheets

TESTER WITH VIRTUAL GROUND

BACKGROUND

A variety of testing equipment may be used during the disk drive engineering and manufacturing process in order to test disk drive components in development and to verify that disk drive components are functioning properly before disk drive assembly. Such testers include dynamic electrical testers for head gimbal assemblies, fly height testers, and other testers/spin stands configured to test read channel and controller hardware/firmware.

The testing equipment described above typically includes a spindle assembly configured to spin one or more disks at high speeds. In many testers, the spindle assembly includes an air bearing spindle motor, and thus the disks may not be electrically coupled to a physical ground via the spindle motor. During testing, a head approaches one of the disks, and, since the head is physically grounded, a difference in electrical potential between the disk and the head can develop. An electrostatic discharge ("ESD") event between the disk and head can thus occur and potentially damage or destroy the head and circuitry coupled thereto.

As a result, many testers incorporate mechanisms for equilibrating the electrical potential between the head and the disks. In some testers, a contact button electrically coupled to a physical ground is positioned at one end of a spindle shaft to which the disks are electrically coupled. The contact button rubs against the spindle shaft and provides an electrical conduit to ground.

Unfortunately, this grounding technique suffers from a number of disadvantages. First, the contact button wears out quickly, and must be frequently replaced. Second, as the contact button wears down, it may cause the spindle assembly to wobble slightly, which, in turn, can cause the head to wander off-track.

There is therefore a need for an improved mechanism for bringing the head and the disks to approximately the same electrical potential.

DETAILED DESCRIPTION

Figure 1:
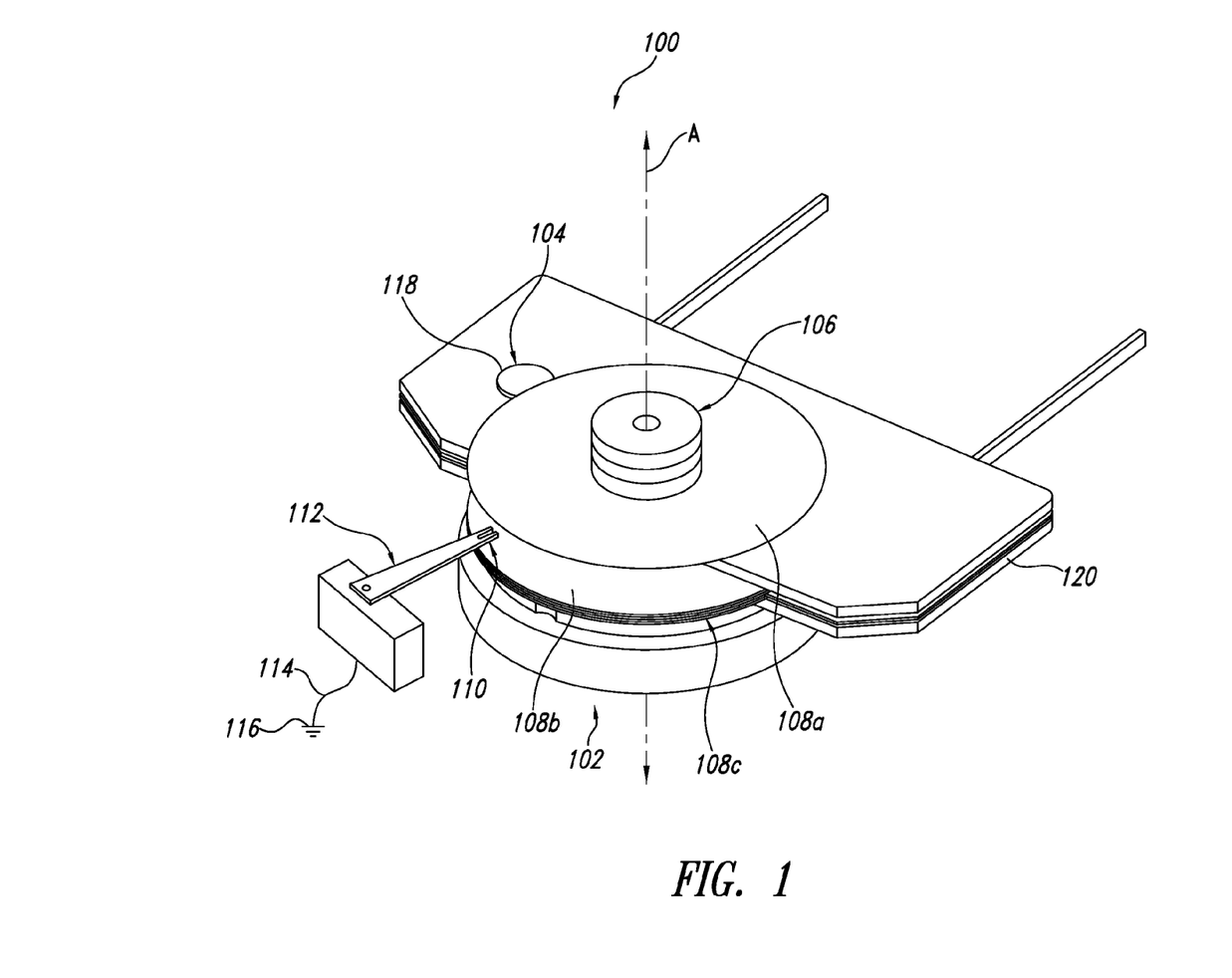
FIG. 1 is a perspective view illustrating an exemplary tester system including a radioactive isotope source in an ionizing location, according to one embodiment.

Referring to FIG. 1, an exemplary tester system 100 is illustrated, according to one embodiment. The tester system 100 includes a tester 102 as well as a radioactive isotope source 104. The tester 102 may include a variety of components, including a spindle assembly 106, a disk 108b mounted to the spindle assembly 106, and a head 110 actuatable over the disk 108b. As illustrated, the tester 102 may also include additional disks 108a, 108c. The radioactive isotope source 104 may be positioned in an ionizing location proximate the tester 102 (as illustrated in FIG. 1), such that a minimum distance between the radioactive isotope source 104 and an axis of rotation A of the disk 108b is less than a radius of the disk 108b. That is, in the ionizing location, there is at least some overlap (from a top view) between the radioactive isotope source 104 and the disk 108b.

The tester 102 may comprise any of a variety of testing equipment for testing disk drive components. In one embodiment, the tester 102 may comprise a dynamic electrical tester ("DET") configured to perform various electrical tests on disk drive heads. In another embodiment, the tester 102 may comprise a fly-height tester configured to detect a fly-height of the head 110 above the disk 108b. In still other embodiments, the tester 102 may comprise a spin stand for testing media, read channels, controller/firmware algorithms, etc. Such testers 102 are commonly used in the manufacture of disk drives; however, they may also be used during the engineering process for developing new disk drive components. The term, tester, as used herein should not be understood to include a conventional disk drive, despite the fact that certain tests may be performed within a conventional disk drive after assembly.

As illustrated, the tester 102 comprises testing equipment for magnetic disk drive components, and the methods described herein will be described in terms of such components. However, the methods and systems described herein may also be applied to and/or implemented in other testers, including, e.g., optical and magneto-optical disk drive component testing equipment.

In one embodiment, the tester 102 includes a spindle assembly 106 configured to couple to and retain a plurality of disks 108a,b,c (collectively, 108). The spindle assembly 106 may include a spindle motor (not shown) configured to rotate such disks 108 about the axis of rotation A. In one embodiment, the spindle motor comprises an air bearing spindle motor that is not structured to provide an electrical connection to ground for the disks 108 mounted thereto. In other embodiments, other spindle motors may be used in the tester 102.

The disks 108 may comprise any of a variety of magnetic or optical disks having a substantially concentric opening defined therethrough. In one embodiment, the tester 102 may include a single disk 108b. However, in other embodiments, the tester 102, as illustrated, may comprise a plurality of disks 108, including one or more test disks 108b,c, as well as a shielding disk 108a configured to shield the disks 108b,c lying beneath. The disks 108b,c may each comprise a plurality of generally concentric tracks for storing data, and may be stacked and separated with one or more disk spacers (not shown) positioned between them on the spindle assembly 106.

The tester 102 may further include a head 110 actuatable over the disk 108b, which is configured to access (that is, read from and/or write to) the disk 108b. In some embodiments, the tester 102 may include additional heads configured to access the other surface of the disk 108b and/or other disks. As illustrated, in one embodiment, the tester 102 may include an actuator arm 112 configured to move the head 110 relative to the disk 108b. In some embodiments, the actuator arm 112 may be configured to rotate about an actuator pivot axis. In other embodiments, the actuator arm 112 may be linearly actuated to different positions relative to the disk 108b.

In one embodiment, the tester 102 further includes a physical ground lead 114 electrically coupled between the head 110 and a physical ground 116. Thus, the head 110 may be at an electrical potential approximately equal to that of the physical ground 116.

Although not illustrated, the tester 102 may further include a variety of circuitry for performing disk drive component tests. In one embodiment, the tester 102 may include a controller for controlling read/write operations and a servo system for generating servo control signals to properly position the actuator arm 112 relative to the disk 108b. The tester 102 may further include a read channel for receiving electrical signals indicative of data read from the disk 108b.

The radioactive isotope source 104 may comprise any of a variety of radioactive isotopes. In one embodiment, the radioactive isotope source 104 may comprise a source of alpha (α) radiation. In other embodiments, the radioactive isotope source 104 may produce beta (β) or gamma (γ) radiation. In still other embodiments, the radioactive isotope source 104 may emit other ionizing particles, such as energetic protons or neutrons.

In one embodiment, the radioactive isotope source 104 comprises polonium-210 and, more specifically, at least 5 mCi of polonium-210. In other embodiments, the radioactive isotope source 104 may comprise more or less polonium-210 based on the ionizing requirements of the tester system 100. The radioactive isotope may ionize air passing nearby by the radiation emitted.

In one embodiment, the radioactive isotope source 104 further comprises a container or canister 118, within which the radioactive isotope is stored. In some embodiments, the container 118 may include at least one surface having one or more openings, such that radiation emitted by the radioactive isotope might ionize the nearby air. These openings in the container 118 may face the disk 108b and are not visible in FIG. 1. The container 118 may comprise a variety of different materials, depending upon the environment of the tester system 100 and the type of radiation emitted by the radioactive isotope contained therein.

Figure 2:
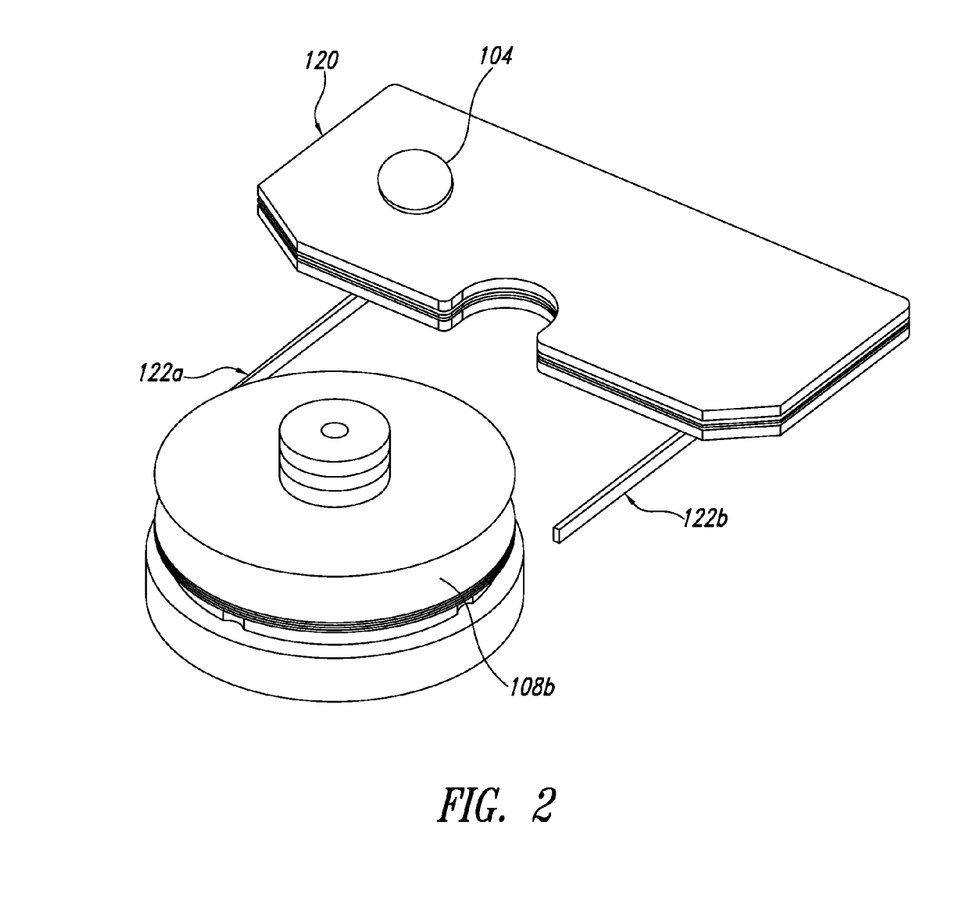
FIG. 2 is a perspective view illustrating the exemplary tester system of FIG. 1 with the radioactive isotope source in a far location, according to one embodiment.

As illustrated, the tester system 100 may further include a shroud 120 configured to carry the radioactive isotope source 104. The shroud 120 may include at least one opening (obscured in FIG. 1 by the container 118) configured to allow air ionized by radiation produced by the radioactive isotope source 104 to pass therethrough. The shroud 120 may also be configured to create more favorable air flow characteristics about the disks 108b,c during operation of the tester 102. The shroud 120 may comprise any of a variety of materials and may have any of a variety of shapes and sizes. In one embodiment, the shroud 120 comprises a plurality of generally parallel aluminum plates. As illustrated in FIG. 2, the shroud 120 may be configured to move the radioactive isotope source 104 from a far location, in which a minimum distance between the radioactive isotope source 104 and the axis of rotation A of the disk 108b is greater than the radius of the disk 108, to the ionizing location (illustrated in FIG. 1). In one embodiment, the shroud 120 may be actuated along rails 122a,b. However, in other embodiments, other structures for moving the shroud 120 and thus the radioactive isotope source 104 may be used.

Figure 3:
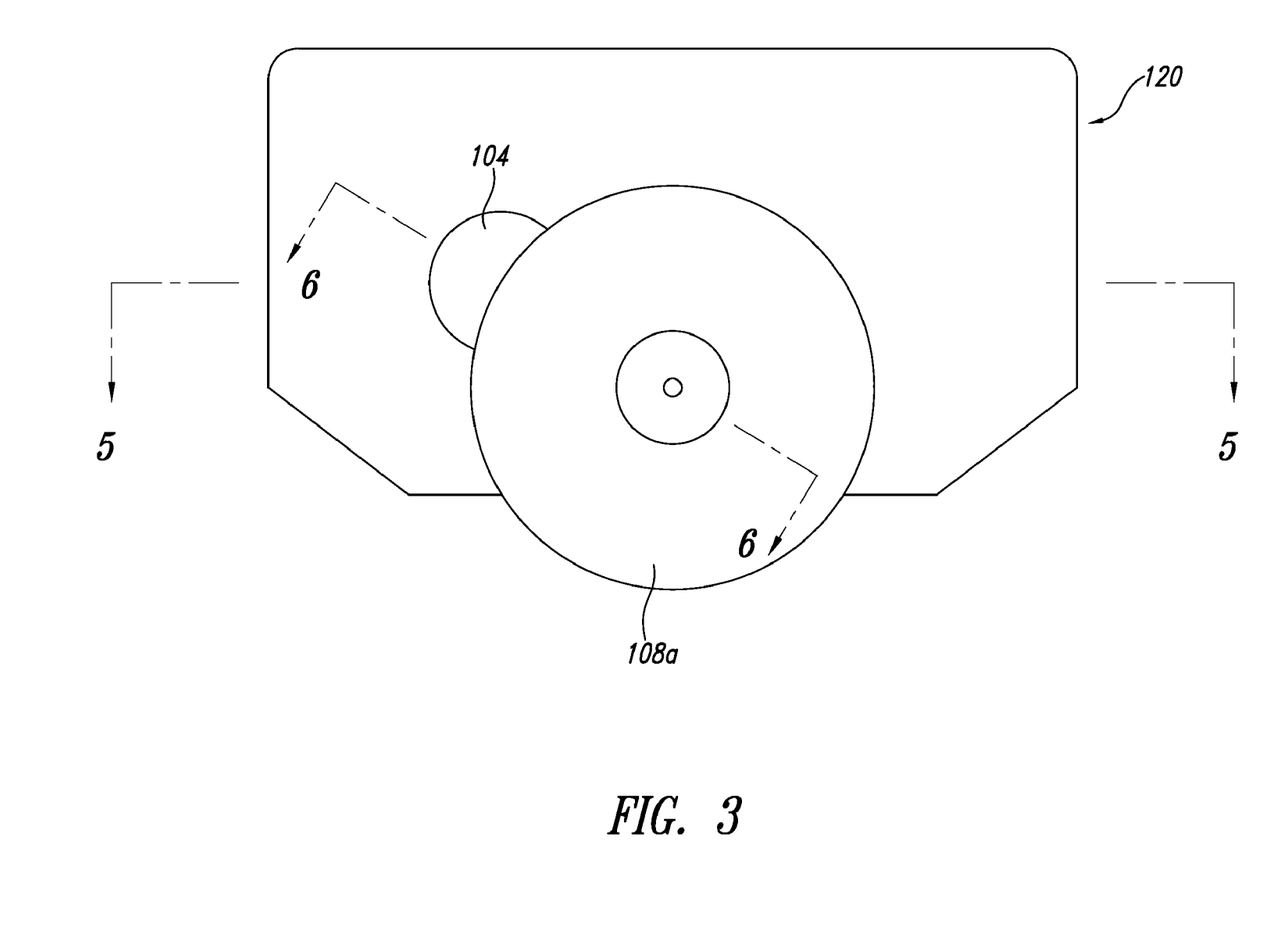
FIG. 3 is a top, schematic view illustrating another exemplary tester system including a radioactive isotope source in an ionizing location, according to one embodiment.
Figure 4:
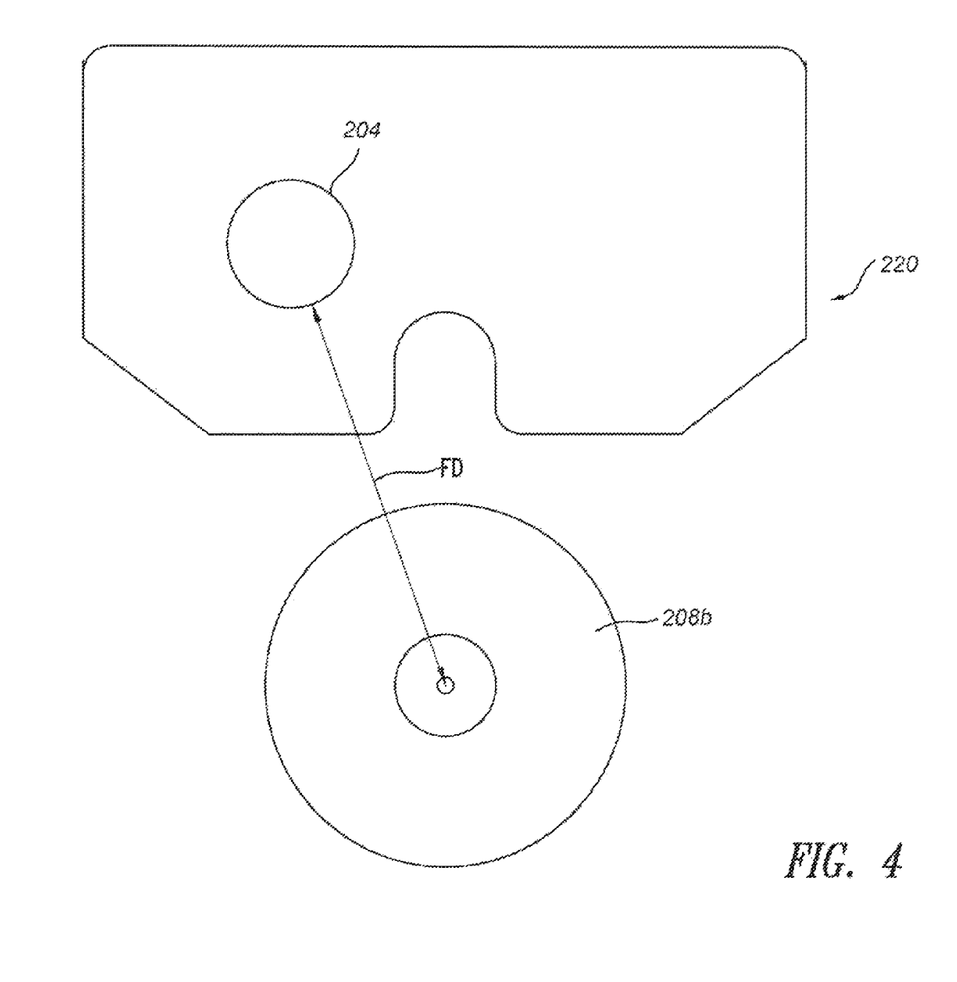
FIG. 4 is a top, schematic view illustrating the exemplary tester system of FIG. 3 with the radioactive isotope source in a far location, according to one embodiment.
Figure 5:
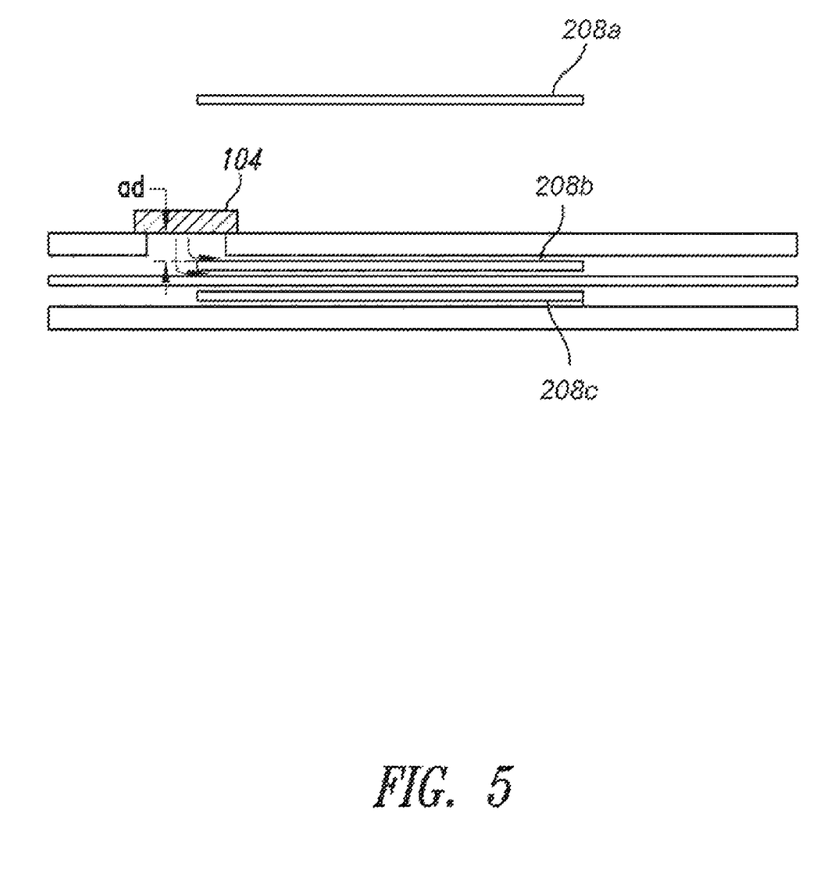
FIG. 5 is a cross-sectional, side view illustrating the exemplary tester system of FIG. 3, according to one embodiment.
Figure 6:
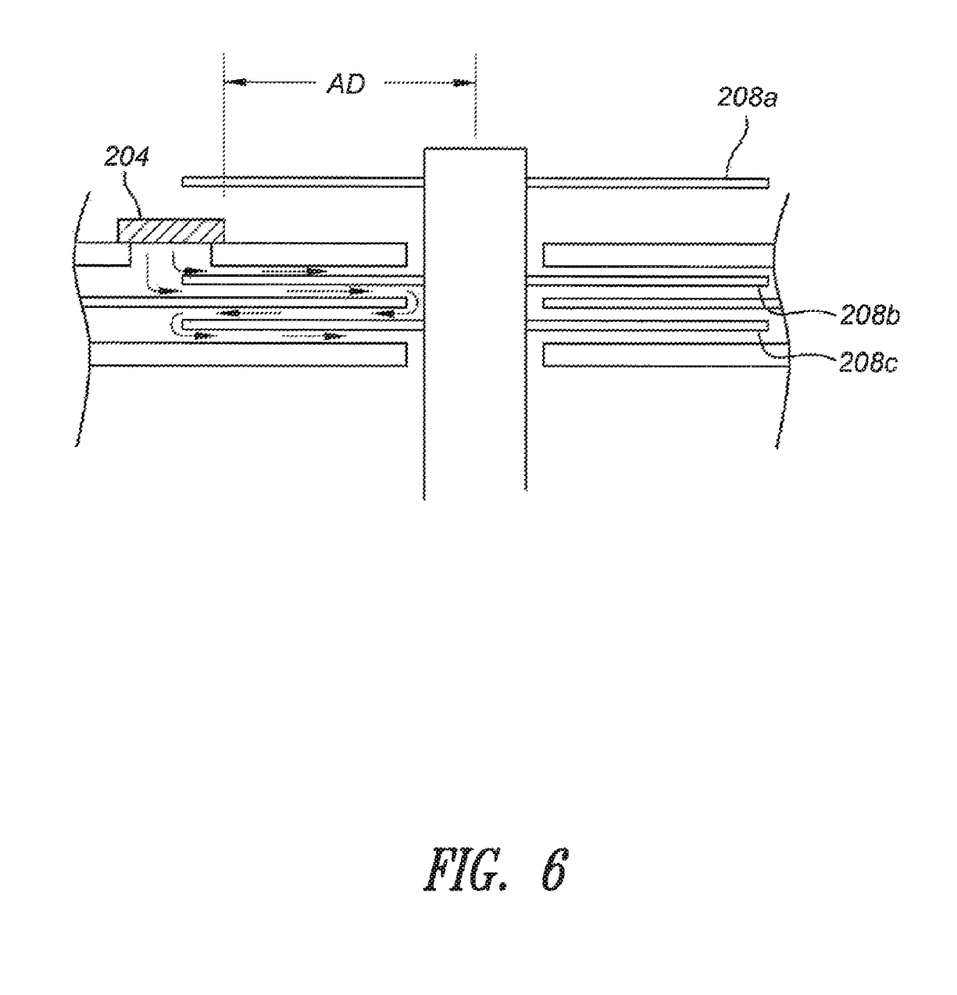
FIG. 6 is another cross-sectional, side view illustrating the exemplary tester system of FIG. 3, according to one embodiment.

FIGS. 3-6 illustrate another exemplary tester system 200. FIGS. 3 and 4 illustrate a radioactive isotope source 204 of the tester system 200 in an ionizing location and far location, respectively, and FIGS. 5 and 6 are respective cross-sectional, side views taken along the dashed lines illustrated in FIG. 3. As illustrated, the tester system 200 may be configured similarly to the tester system 100, with like numerals referring to like parts.

As illustrated in FIG. 4, in the far location, the minimum distance FD between the radioactive isotope source 204 and the axis of rotation A of the disk 208b may be greater than a radius of the disk 208b. In one embodiment, the minimum distance FD is greater than a diameter of the disk 208b. Thus, in one embodiment, in this far location, air ionized by radiation produced by the radioactive isotope source 204 may have substantially no effect on any of the disks 208 of the tester 202.

As shown in FIG. 5, in the ionizing location, the minimum distance ID between the radioactive isotope source 204 and the axis of rotation A of the disk 208b may be less than the radius of the disk 208b. The radioactive isotope source 204 may be positioned such that when the disk 208b spins and creates an air flow around the tester 202 (represented by arrows), the air flow may cause air ionized by radiation produced by the radioactive isotope source 204 to contact the disk 208b. As the disk 208b spins, the air adjacent the disk 208b will move rapidly past the opening in the shroud 204, thus creating a low pressure region that will draw ionized air from adjacent the radioactive isotope source 204. Moreover, due to the configuration of the shroud 220, the ionized air may also travel around the tester 202 and contact additional disks (e.g., disk 208c), as well as the spindle assembly 206.

As illustrated in FIG. 6, in the ionizing location, the radioactive isotope source 204 may also be positioned such that a minimum axial distance AD along an axis parallel to the axis of rotation A of the disk 208b between the radioactive isotope source 208b and a plane defined by the disk 208b may be less than 80 mm. Such an axial distance AD may improve the chances of air ionized by the radiation produced by the radioactive isotope source 204 reaching the disk 208b. In some embodiments, the minimum axial distance AD may be further decreased to less than 25 mm.

Figure 7:
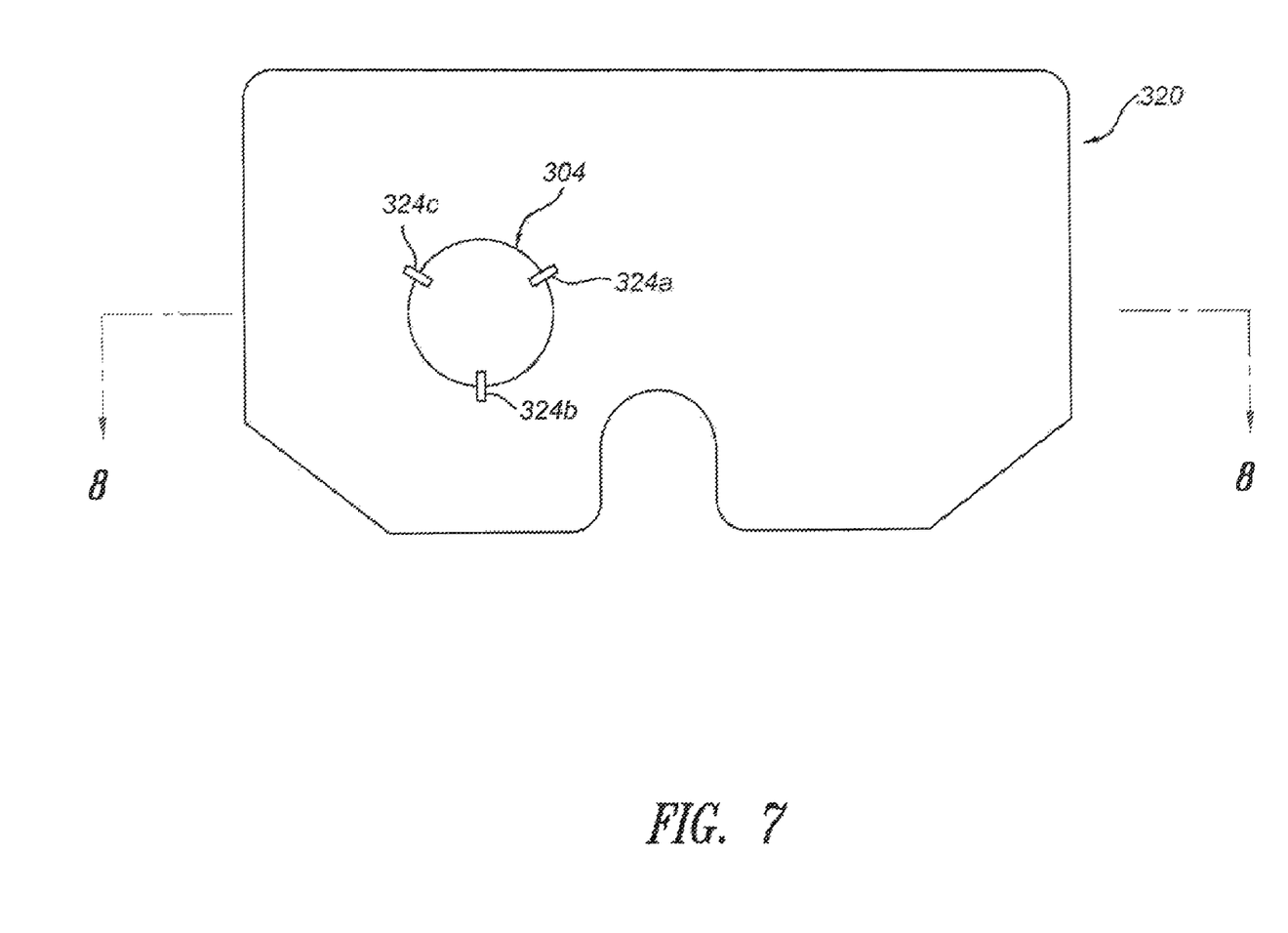
FIG. 7 is a top, schematic view illustrating an exemplary shroud carrying a radioactive isotope source, according to one embodiment.
Figure 8:
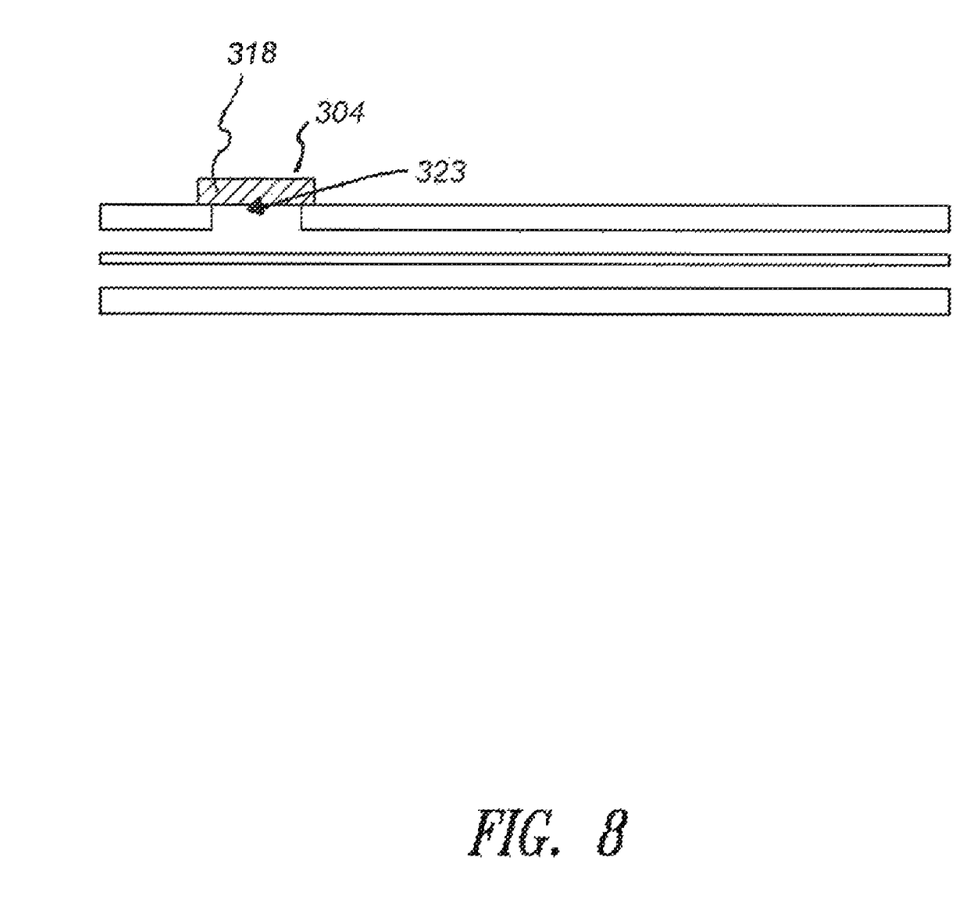
FIG. 8 is a cross-sectional, side view illustrating the exemplary shroud of FIG. 7, according to one embodiment.

FIGS. 7 and 8 illustrate another embodiment of a shroud 320 and a radioactive isotope source 304 configured similarly to the shrouds and radioactive isotope sources discussed at length above. As illustrated in FIG. 7, a plurality of clamps 324a,b,c (collectively, 324) may be employed to affix the radioactive isotope source 304 relative to the shroud 320. When the radioactive isotope source 304 has exceeded its useful life, it may be easily replaced by removing these clamps 324. Of course, in other embodiments, other mechanisms for positioning the radioactive isotope source 304 relative to the shroud 320 may be used. As illustrated in FIG. 8, the container 318 of the radioactive isotope source 304 may include a surface 323 having one or more openings, such that radiation emitted by the radioactive isotope source 304 might ionize the nearby air. In one embodiment, for example, the surface 323 may comprise a mesh material that allows substantially free air circulation.

Figure 9:
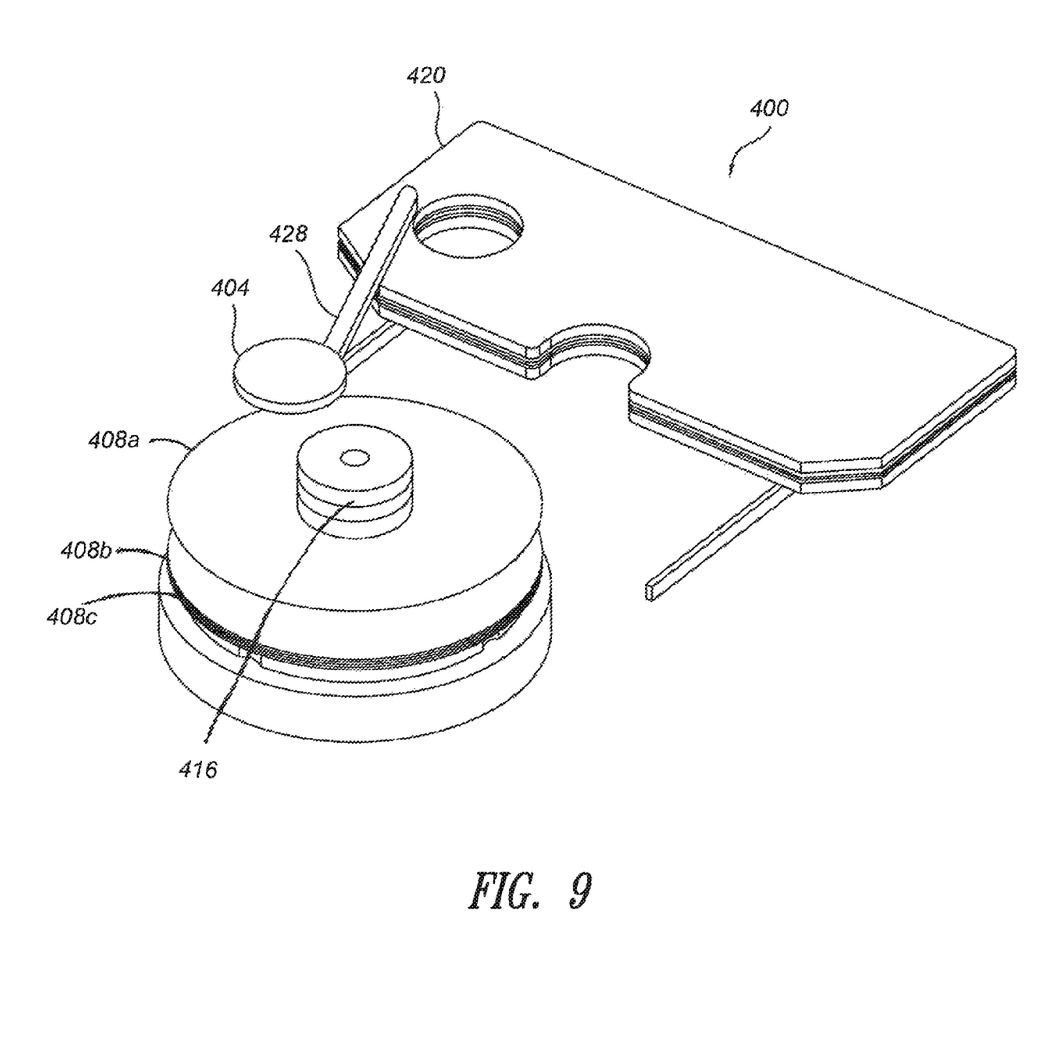
FIG. 9 is a perspective view illustrating yet another exemplary tester system including a radioactive isotope source in an ionizing location, according to one embodiment.

In FIG. 9, yet another exemplary tester system 400 is illustrated. The tester system 400 may be configured similarly to the tester system 100, with like numerals referring to like parts. As illustrated, the tester system 400 may include a mounting arm 428 configured to carry a radioactive isotope source 404. The mounting arm 428 may extend from a shroud 420. However, in other embodiments, the tester system 400 need not include a shroud 420, and the mounting arm 428 may instead extend from another structure. The mounting arm 428 may, in some embodiments, be actuatable in order to move the radioactive isotope source 404 between an ionizing location (as illustrated) and a far location.

As illustrated, the mounting arm 428 may position the radioactive isotope source 404 near a shielding disk 408a. As the shielding disk 408a and test disks 408b,c are electrically coupled via a spindle assembly 416, in different embodiments, the radioactive isotope source 404 may be positioned near any of these disks 408a,b,c in order to achieve the desired ionizing function.

Figure 10:
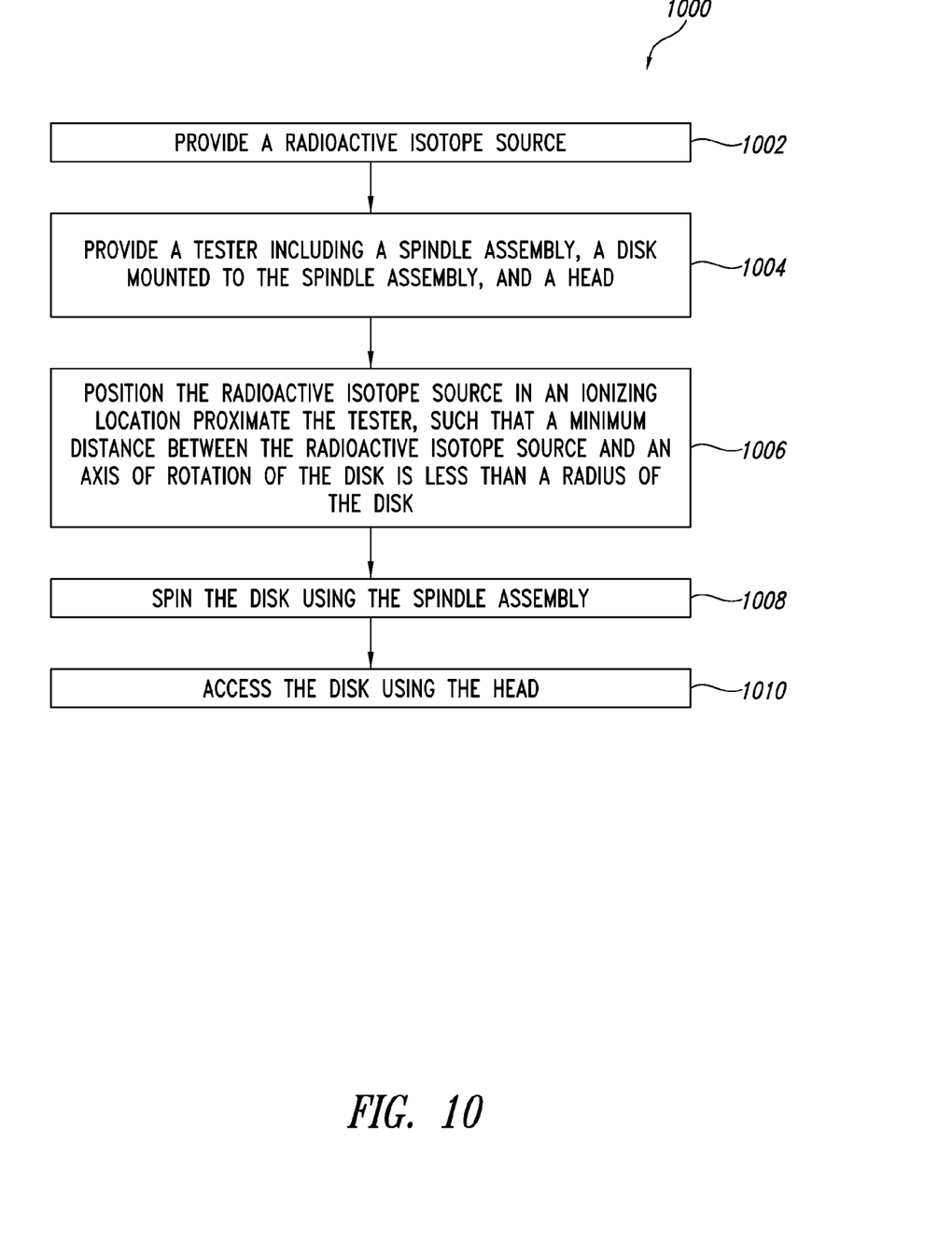
FIG. 10 illustrates a flow chart for a method of manufacturing disk drives, according to one embodiment.

FIG. 10 illustrates a flow chart for a method 1000 of manufacturing a disk drive, according to one illustrated embodiment. This method 1000 will be discussed in the context of the tester system 100 of FIGS. 1 and 2. However, the acts disclosed herein may be executed using any tester system (including any of the configurations illustrated in FIGS. 3-9), in accordance with the described method. Moreover, although described in the context of manufacturing, the acts of method 1000 may also be carried out during an engineering/testing process independent of the disk drive manufacturing process.

As described herein, many of the acts comprising the method 1000 may be orchestrated by a processor according to an automatic manufacturing algorithm, based at least in part on computer-readable instructions stored in computer-readable memory and executable by the processor. Of course, a manual implementation of one or more acts of the method 1000 may also be employed.

At act 1002, a radioactive isotope source 104 is provided. The radioactive isotope source 104 may be provided in any of a variety of ways. In one embodiment, the radioactive isotope source 104 may include a container 118, and the container 118 may be positioned atop a shroud 120 and affixed thereto.

As described above, the radioactive isotope source 104 may comprise any of a variety of radioactive materials. In one embodiment, the radioactive isotope source 104 may comprise a source of alpha ($\alpha$) radiation, such as polonium-210.

At act 1004, a tester 102 including a spindle assembly 106, a disk 108b mounted to the spindle assembly 106, and a head 110 is provided. As described above, the tester 102 may comprise any of a variety of testing equipment for testing disk drive components, and may be used in a disk drive manufacturing process prior to assembly.

At act 1006, the radioactive isotope source 104 is positioned in an ionizing location proximate the tester 102, such that a minimum distance between the radioactive isotope source 104 and an axis of rotation A of the disk 108b is less than a radius of the disk 108b. One example of such an ionizing location is shown in FIG. 1. In other embodiments, the radioactive isotope source 104 may be positioned above, below or between the disks 108a, b in any of a variety of positions that meet the minimum distance requirements set forth above.

In one embodiment, the tester system 100 may include a shroud 120, and positioning the radioactive isotope source 104 may include actuating the shroud 120 carrying the radioactive isotope source 104 to move the radioactive isotope source 104 from a far location (shown in FIG. 2), in which a minimum distance between the radioactive isotope source and the axis of rotation A of the disk 108b is greater than the radius of the disk 108b, to the ionizing location. In such an embodiment, the radioactive isotope source 104 may be mounted in the shroud 120 at the far location before actuating the shroud 120 to move the radioactive isotope source 104 from the far location to the ionizing location.

In another embodiment, the tester system 400 may include a mounting arm 428 (as illustrated in FIG. 9), and positioning the radioactive isotope source 104 may include actuating the mounting arm 428 carrying the radioactive isotope source 104. In still other embodiments, the radioactive isotope source 104 may be coupled to other structures and/or may be relatively permanently positioned in the ionizing location.

At act 1008, the disk 108b is spun using the spindle assembly 106. As described above, the spindle assembly 106 may include a spindle motor (e.g., an air bearing spindle motor) configured to rotate disks 108 about the axis of rotation A.

In one embodiment, spinning the disk 108b may include creating an air flow around the tester 102, the air flow causing air ionized by radiation produced by the radioactive isotope source 104 to contact the disk 108b. One exemplary air flow is illustrated in FIG. 5. By causing the ionized air to contact the disk 108b, the disk 108b may be brought to a substantially balanced electrical potential.

In one embodiment, the head 110 may be physically grounded (e.g., by a physical ground lead 114) to bring the head 110 to a head potential substantially equal to the substantially balanced electrical potential of the disk 108b. Both the head 110 and the disk 108b may thus be at substantially equal electrical potentials, greatly reducing the chances of an electrostatic discharge event.

At act 1010, the disk 108b is accessed using the head 110. As described above, the head 110 may be brought close to the disk 108b (e.g., via an actuator arm 112) and may perform a read and/or write operation. Any of a variety of operations may be performed based on the tests performed by the tester 102. For example, accessing the disk 108b may comprise a portion of a dynamic electrical test of the head 110.

The foregoing detailed description has set forth various embodiments of the systems and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

We claim:

1. A method of manufacturing disk drives, the method comprising:
   providing a radioactive isotope source;
   providing a tester including a spindle assembly, a disk mounted to the spindle assembly, and a head;
   positioning the radioactive isotope source from a far location at a distance greater than the radius of the disk to an ionizing location proximate the tester, such that a minimum distance between the radioactive isotope source and an axis of rotation of the disk is less than a radius of the disk;
   spinning the disk using the spindle assembly; and
   accessing the disk using the head.

2. The method of claim 1, wherein positioning the radioactive isotope source in the ionizing location includes actuating a shroud carrying the radioactive isotope source to move the radioactive isotope source from a far location, in which a minimum distance between the radioactive isotope source and the axis of rotation of the disk is greater than the radius of the disk, to the ionizing location.

3. The method of claim 2, wherein the shroud defines at least one opening configured to allow air ionized by radiation produced by the radioactive isotope source to pass.

4. The method of claim 2, further comprising mounting the radioactive isotope source in the shroud at the far location before actuating the shroud to move the radioactive isotope source from the far location to the ionizing location.

5. The method of claim 1, wherein spinning the disk includes creating an air flow around the tester, the air flow causing air ionized by radiation produced by the radioactive isotope source to contact the disk.

6. The method of claim 5, further comprising bringing the disk to a substantially balanced electrical potential by causing the ionized air to contact the disk.

7. The method of claim 6, further comprising physically grounding the head to bring the head to a head potential substantially equal to the substantially balanced electrical potential.

8. The method of claim 1, wherein, in the ionizing location, the radioactive isotope source is positioned such that a minimum axial distance along an axis parallel to the axis of rotation of the disk between the radioactive isotope source and a plane defined by the disk is less than 80 mm.

9. The method of claim 8, wherein the minimum axial distance is less than 25 mm.

10. The method of claim 1, wherein providing the radioactive isotope source includes providing a source of alpha radiation.

11. The method of claim 10, wherein providing the source of alpha radiation includes providing polonium-210.

12. The method of claim 11, wherein providing polonium-210 includes providing at least 5 mCi of polonium-210.

13. The method of claim 1, wherein accessing the disk comprises a portion of a dynamic electrical test of the head.

14. The method of manufacturing disk drives, the method comprising:
- providing a radioactive isotope source;
- providing a tester including a spindle assembly, a disk mounted to the spindle assembly, and a head;
- positioning the radioactive isotope source to an ionizing location proximate the tester, such that a minimum distance between the radioactive isotope source and an axis of rotation of the disk is less than a radius of the disk, wherein positioning the radioactive isotope source in the ionizing location includes actuating a mounting arm carrying the radioactive isotope source;
- spinning the disk using the spindle assembly; and
- accessing the disk using the head.

15. A tester system, comprising:
a tester including:
- a spindle assembly;
- a disk mounted to the spindle assembly; and
- a head actuatable over the disk; and
- a radioactive isotope source positioned by a shroud in an ionizing location proximate the tester, such that a minimum distance between the radioactive isotope source and an axis of rotation of the disk is less than a radius of the disk.

16. The tester system of claim 15, wherein the shroud is configured to carry the radioactive isotope source, the shroud including at least one opening configured to allow air ionized by radiation produced by the radioactive isotope source to pass.

17. The tester system of claim 16, wherein the shroud is configured to move the radioactiveisotope source from a far location, in which a minimum distance between the radioactive isotope source and the axis of rotation of the disk is greater than the radius of the disk, to the ionizing location.

18. The tester system of claim 15, wherein, in the ionizing location, the radioactive isotope source is positioned such that when the disk spins and creates an air flow around the tester, the air flow causes air ionized by radiation produced by the radioactive isotope source to contact the disk.

19. The tester system of claim 15, wherein the tester further includes a physical ground lead electrically coupled between the head and a ground.

20. The tester system of claim 15, wherein the radioactive isotope source is positioned such that a minimum axial distance along an axis parallel to the axis of rotation of the disk between the radioactive isotope source and a plane defined by the disk is less than 80 mm.

21. The tester system of claim 20, wherein the minimum axial distance is less than 25 mm.

22. The tester system of claim 15, wherein the radioactive isotope source comprises a source of alpha radiation.

23. The tester system of claim 22, wherein the source of alpha radiation comprises polonium-210.

24. The tester system of claim 23, wherein the source of alpha radiation comprises at least 5 mCi of polonium-210.

25. A tester system, comprising:
- a spindle assembly;
- a disk mounted to the spindle assembly; and
- a head actuatable over the disk;
- a radioactive isotope source positioned in an ionizing location proximate the tester, such that a minimum distance between the radioactive isotope source and an axis of rotation of the disk is less than a radius of the disk; and
- a mounting arm configured to carry the radioactive isotope source.

* * * * *